United States Patent
Zirwas et al.

(10) Patent No.: US 9,240,932 B2
(45) Date of Patent: Jan. 19, 2016

(54) VOIP COOPERATIVE MULTIPOINT SOLUTION

(75) Inventors: Wolfgang Zirwas, Munich (DE); Simone Redana, Munich (DE); Michael Faerber, Wolfratshausen (DE); Xiaoben He, Espoo (FI); Jacek Gora, Wroclaw (PL); Krystian Safjan, Nowy Sacz (PL)

(73) Assignee: Nokia Solutions and Networks Oy, Espoo (FI)

( * ) Notice: Subject to any disclaimer, the term of this patent is extended or adjusted under 35 U.S.C. 154(b) by 39 days.

(21) Appl. No.: 14/116,854

(22) PCT Filed: May 11, 2011
(Under 37 CFR 1.47)

(86) PCT No.: PCT/EP2011/057624
§ 371 (c)(1),
(2), (4) Date: Jun. 9, 2014

(87) PCT Pub. No.: WO2012/152325
PCT Pub. Date: Nov. 15, 2012

(65) Prior Publication Data
US 2014/0348011 A1    Nov. 27, 2014

(51) Int. Cl.
H04B 7/00 (2006.01)
H04L 12/26 (2006.01)
H04M 7/00 (2006.01)
H04L 1/00 (2006.01)

(52) U.S. Cl.
CPC .............. *H04L 43/04* (2013.01); *H04L 1/0025* (2013.01); *H04L 1/0026* (2013.01); *H04L 1/0027* (2013.01); *H04L 1/0072* (2013.01); *H04M 7/006* (2013.01); *H04M 7/0066* (2013.01); *H04L 1/0002* (2013.01)

(58) Field of Classification Search
CPC .......... H04W 72/044; H04W 72/1263; H04W 76/02
USPC .................. 370/310, 328, 329, 349, 431, 437
See application file for complete search history.

(56) References Cited

U.S. PATENT DOCUMENTS

| | | | |
|---|---|---|---|
| 5,896,561 A * | 4/1999 | Schrader et al. ............ 455/67.11 |
| 7,903,728 B2 * | 3/2011 | Chen et al. ..................... 375/232 |
| 8,280,443 B2 * | 10/2012 | Tao et al. ................... 455/562.1 |
| 8,457,091 B2 * | 6/2013 | Pani et al. ...................... 370/342 |
| 8,477,631 B2 * | 7/2013 | Ramakrishnan et al. ...... 370/241 |
| 2008/0268785 A1 * | 10/2008 | McCoy et al. .............. 455/67.11 |

FOREIGN PATENT DOCUMENTS

WO    WO 2010/078425 A1    7/2010

\* cited by examiner

*Primary Examiner* — Dmitry H Levitan
(74) *Attorney, Agent, or Firm* — Harrington & Smith

(57) ABSTRACT

It is provided a user equipment, including mode switching means adapted to switch, autonomously or based on a command from a base station of a communication system to which the user equipment belongs, the user equipment into a low data rate mode; measuring means adapted to measure a downlink reference signal received on a downlink from the base station; feedback preparing means adapted to prepare a feedback based on the measurement by the measuring means; encoding means adapted to encode the feedback, thus obtaining encoded data; modulating means adapted to modulate the encoded data; and providing means adapted to provide the modulated encoded data for being sent on the uplink at a predetermined time after the downlink reference signal was received, if the user equipment is in the low data rate mode.

12 Claims, 7 Drawing Sheets

VOIP COOPERATIVE MULTIPOINT SOLUTION

FIELD OF THE INVENTION

The present invention relates to an apparatus, a method, a system, and a computer program product related to coordinated multipoint transmission. More particularly, the present invention relates to an apparatus, a method, a system, and a computer program product for voice over IP under coordinated multipoint transmission.

BACKGROUND OF THE INVENTION

Abbreviations:
3GPP: $3^{rd}$ generation partnership project
CA: cooperation area
CoMP: cooperative multipoint transmission
CSI: channel state information
eNB: enhanced node B
DL: downlink
DM RS: demodulation reference signals
HARQ: hybrid adaptive repeat and request
IP: internet protocol
JP: joint precoding
LTE: long term evolution
LTE-A: LTE-advanced
MCS: modulation and coding scheme
PRB: physical resource block
PDCCH: physical DL control channel
PDSCH: physical DL shared channel
PUCCH: physical UL control channel
PUSCH: physical UL shared channel
RS: reference signal
RSRP: RS received power
SRS: sounding reference signals
TTI: transmission time interval
UE: user equipment
UL: uplink
VoIP: voice over IP The field of invention is mobile radio system concepts like LTE, LTE-A and its evolution, dealing with the case of supporting functions for low data rate users and specifically of VoIP users for joint precoding coordinated multi point (JP-CoMP) transmission.

CoMP—and more specifically JP CoMP—allows overcoming interference as well as provides diversity gains and is therefore a promising candidate for further improvements, but unfortunately there are still practical limitations for a smooth implementation.

SUMMARY OF THE INVENTION

It is an object of the present invention to improve the prior art.

According to a first aspect of the invention, there is provided a user equipment, comprising mode switching means adapted to switch, autonomously or based on a command from a base station of a communication system to which the user equipment belongs, the user equipment into a low data rate mode; measuring means adapted to measure a downlink reference signal received on a downlink from the base station; feedback preparing means adapted to prepare a feedback based on the measurement by the measuring means; encoding means adapted to encode the feedback, thus obtaining encoded data; modulating means adapted to modulate the encoded data; and providing means adapted to provide the modulated encoded data for being sent on the uplink at a predetermined time after the downlink reference signal was received, if the user equipment is in the low data rate mode.

In the user equipment, the encoding means may be adapted, if the user equipment is in the low data rate mode, to jointly encode uplink data to be transmitted on an uplink to the base station and the feedback, thus obtaining the encoded data.

According to a second aspect of the invention, there is provided a user equipment, comprising mode switching means adapted to switch, autonomously or based on a command from a base station of a communication system to which the user equipment belongs, the user equipment into a low data rate mode; measuring means adapted to measure a downlink reference signal received on a downlink from the base station; feedback preparing means adapted to prepare a feedback based on the measurement by the measuring means; encoding means adapted, if the user equipment is in the low data rate mode, to jointly encode uplink data to be transmitted on an uplink to the base station and the feedback, thus obtaining encoded data; modulating means adapted to modulate the encoded data; and providing means adapted to provide the modulated encoded data for being sent on the uplink.

In the user equipment according to the first or second aspects, the measuring means may be adapted to repeatedly receive respective downlink reference signals on the downlink; the apparatus may further comprise prohibiting means adapted to prohibit the measuring means from measuring the respective downlink reference signal except for every $n^{th}$ downlink reference signal with $n \geq 2$.

The user equipment according to the first or second aspects may further comprise detecting means to detect autonomously a downlink reference signal; and the measuring means may be adapted to measure the downlink reference signal triggered by the detecting by the detecting means.

The user equipment according to the first or second aspects may further comprise detecting means adapted to detect if the user equipment performs one of one or more predetermined low data rate services, wherein the mode switching means may be adapted to switch autonomously into the low data rate mode if the detecting means detects that the user equipment performs one of one or more predetermined low data rate services.

According to a third aspect of the invention, there is provided a user equipment, comprising mode switching processor adapted to switch, autonomously or based on a command from a base station of a communication system to which the user equipment belongs, the user equipment into a low data rate mode; measuring processor adapted to measure a downlink reference signal received on a downlink from the base station; feedback preparing processor adapted to prepare a feedback based on the measurement by the measuring processor; encoding processor adapted to encode the feedback, thus obtaining encoded data; modulating processor adapted to modulate the encoded data; and providing processor adapted to provide the modulated encoded data for being sent on the uplink at a predetermined time after the downlink reference signal was received, if the user equipment is in the low data rate mode.

In the user equipment, the encoding processor may be adapted, if the user equipment is in the low data rate mode, to jointly encode uplink data to be transmitted on an uplink to the base station and the feedback, thus obtaining the encoded data.

According to a fourth aspect of the invention, there is provided a user equipment, comprising mode switching processor adapted to switch, autonomously or based on a command from a base station of a communication system to which the user equipment belongs, the user equipment into a low data rate mode; measuring processor adapted to measure a downlink reference signal received on a downlink from the base station; feedback preparing processor adapted to prepare a feedback based on the measurement by the measuring processor; encoding processor adapted, if the user equipment is in the low data rate mode, to jointly encode uplink data to be transmitted on an uplink to the base station and the feedback, thus obtaining encoded data; modulating processor adapted to modulate the encoded data; and providing processor adapted to provide the modulated encoded data for being sent on the uplink.

In the user equipment according to the third or fourth aspects, the measuring processor may be adapted to repeatedly receive respective downlink reference signals on the downlink; the apparatus may further comprise prohibiting processor adapted to prohibit the measuring processor from measuring the respective downlink reference signal except for every $n^{th}$ downlink reference signal with n≥2.

The user equipment according to the third or fourth aspects may further comprise detecting processor to detect autonomously a downlink reference signal; and the measuring processor may be adapted to measure the downlink reference signal triggered by the detecting by the detecting processor.

The user equipment according to the third or fourth aspects may further comprise detecting processor adapted to detect if the user equipment performs one of one or more predetermined low data rate services, wherein the mode switching processor may be adapted to switch autonomously into the low data rate mode if the detecting processor detects that the user equipment performs one of one or more predetermined low data rate services.

According to a fifth aspect of the invention, there is provided a base station, comprising at least one of a signaling means and a detecting means, wherein the signalling means is adapted to signal to a user equipment of a communication system of the base station a command to switch into a low data rate mode, and the detecting means is adapted to detect an indication according to which the user equipment is autonomously switched into the low data rate mode; downlink reference signal providing means adapted to provide a downlink reference signal; demodulating means adapted, if the command was signaled, to demodulate modulated data comprising a feedback, wherein the modulated data are received on an uplink from the user equipment at a first predetermined time after the downlink reference signal was provided, and wherein the feedback provides information of a state of a downlink to the user equipment based on the downlink reference signal; decoding means adapted to decode the demodulated data, thus obtaining the feedback.

In the base station, the demodulating means may be adapted, if the command was signaled, to demodulate the modulated data comprising uplink data and the feedback which are jointly encoded; and the decoding means may be adapted to decode the demodulated data, thus obtaining the uplink data and the feedback.

According to a sixth aspect of the invention, there is provided a base station, comprising at least one of a signaling means and a detecting means, wherein the signalling means is adapted to signal to a user equipment of a communication system of the base station a command to switch into a low data rate mode, and the detecting means is adapted to detect an indication according to which the user equipment is autonomously switched into the low data rate mode; downlink reference signal providing means adapted to provide a downlink reference signal; demodulating means adapted, if the command was signaled, to demodulate modulated data comprising uplink data and a feedback which are jointly encoded, wherein the modulated data are received on an uplink from the user equipment, and wherein the feedback provides information of a state of a downlink to the user equipment based on the downlink reference signal; decoding means adapted to decode the demodulated data, thus obtaining the uplink data and the feedback.

The base station according to the fifth or sixth aspects may further comprise providing means adapted to provide downlink data to be sent to the user equipment on the downlink according to the feedback, wherein the providing means may be adapted to provide the downlink data after the feedback was received at a second predetermined time after the feedback was requested.

The base station according to the fifth or sixth aspects may further comprise assigning means adapted to assign a demodulation reference signal to each of plural user equipments within a cooperation area to which the base station belongs, wherein the respective demodulation reference signals assigned to each of plural user equipments are mutually orthogonal or quasi-orthogonal to each other, wherein the demodulating means may be adapted to demodulate the modulated data from each of the user equipments based on the respective demodulation reference signal.

The base station according to the fifth or sixth aspects may further comprise silence detecting means adapted to detect a silent period where no data are to be transmitted on the uplink and the downlink; prohibiting means adapted to prohibit the state requesting means from requesting the feedback at times when the silent period is detected.

In the base station according to the fifth or sixth aspects, the indication may comprise downlink data to be sent to the user equipment that are related to one of one or more predetermined low data rate services.

According to a seventh aspect of the invention, there is provided a base station, comprising at least one of a signaling processor and a detecting processor, wherein the signalling processor is adapted to signal to a user equipment of a communication system of the base station a command to switch into a low data rate mode, and the detecting processor is adapted to detect an indication according to which the user equipment is autonomously switched into the low data rate mode; downlink reference signal providing processor adapted to provide a downlink reference signal; demodulating processor adapted, if the command was signaled, to demodulate modulated data comprising a feedback, wherein the modulated data are received on an uplink from the user equipment at a first predetermined time after the downlink reference signal was provided, and wherein the feedback provides information of a state of a downlink to the user equipment based on the downlink reference signal; decoding processor adapted to decode the demodulated data, thus obtaining the feedback.

In the base station, the demodulating processor may be adapted, if the command was signaled, to demodulate the modulated data comprising uplink data and the feedback which are jointly encoded; and the decoding processor may be adapted to decode the demodulated data, thus obtaining the uplink data and the feedback.

According to an eighth aspect of the invention, there is provided a base station, comprising at least one of a signaling processor and a detecting processor, wherein the signalling processor is adapted to signal to a user equipment of a communication system of the base station a command to switch into a low data rate mode, and the detecting processor is adapted to detect an indication according to which the user equipment is autonomously switched into the low data rate mode; downlink reference signal providing processor adapted to provide a downlink reference signal; demodulating processor adapted, if the command was signaled, to demodulate modulated data comprising uplink data and a feedback which are jointly encoded, wherein the modulated data are received on an uplink from the user equipment, and wherein the feedback provides information of a state of a downlink to the user equipment based on the downlink reference signal; decoding processor adapted to decode the demodulated data, thus obtaining the uplink data and the feedback.

The base station according to the seventh or eighth aspects may further comprise providing processor adapted to provide downlink data to be sent to the user equipment on the downlink according to the feedback, wherein the providing processor may be adapted to provide the downlink data after the feedback was received at a second predetermined time after the feedback was requested.

The base station according to the seventh or eighth aspects may further comprise assigning processor adapted to assign a demodulation reference signal to each of plural user equipments within a cooperation area to which the base station belongs, wherein the respective demodulation reference signals assigned to each of plural user equipments are mutually orthogonal or quasi-orthogonal to each other, wherein the demodulating processor may be adapted to demodulate the modulated data from each of the user equipments based on the respective demodulation reference signal.

The base station according to the seventh or eighth aspects may further comprise silence detecting processor adapted to detect a silent period where no data are to be transmitted on the uplink and the downlink; prohibiting processor adapted to prohibit the state requesting processor from requesting the feedback at times when the silent period is detected.

In the base station according to the seventh or eighth aspects, the indication may comprise downlink data to be sent to the user equipment that are related to one of one or more predetermined low data rate services.

According to a ninth aspect of the invention, there is provided a system, comprising at least two base station apparatuses according to any of the fifth and sixth aspects, wherein each of the at least two base station apparatuses comprises precoding means adapted to precode the downlink data; and wherein the precoding means of the at least two base station apparatuses are adapted to jointly precode the downlink data; the providing means of the at least two base station apparatuses are adapted to provide the precoded downlink data cooperatively; the signaling means of at least one of the at least two base station apparatuses is adapted to provide the command; and the downlink reference signal providing means of at least one of the at least two base station apparatuses is adapted to provide the downlink reference signal.

The system may further comprise a user equipment apparatus according to any of the first and second aspects, wherein the user equipment of each of the at least two base station apparatuses comprises the user equipment apparatus; the uplink of the user equipment apparatus comprises the uplink of each of the base station apparatuses; the feedback received by the at least two base station apparatuses comprises the feedback provided by the user equipment apparatuses; the command received by the user equipment comprises the command provided by the at least two base station apparatuses; and the downlink reference signal received by the user equipment comprises the downlink reference signal provided by the at least two base station apparatuses.

According to a tenth aspect of the invention, there is provided a system, comprising at least two base station apparatuses according to any of the seventh and eighth aspects, wherein each of the at least two base station apparatuses comprises precoding processor adapted to precode the downlink data; and wherein the precoding processor of the at least two base station apparatuses are adapted to jointly precode the downlink data; the providing processor of the at least two base station apparatuses are adapted to provide the precoded downlink data cooperatively; the signaling processor of at least one of the at least two base station apparatuses is adapted to provide the command; and the downlink reference signal providing processor of at least one of the at least two base station apparatuses is adapted to provide the downlink reference signal.

The system may further comprise a user equipment apparatus according to any of the third and fourth aspects, wherein the user equipment of each of the at least two base station apparatuses comprises the user equipment apparatus; the uplink of the user equipment apparatus comprises the uplink of each of the base station apparatuses; the feedback received by the at least two base station apparatuses comprises the feedback provided by the user equipment apparatuses; the command received by the user equipment comprises the command provided by the at least two base station apparatuses; and the downlink reference signal received by the user equipment comprises the downlink reference signal provided by the at least two base station apparatuses.

According to an eleventh aspect of the invention, there is provided a method, comprising providing a user equipment functionality of a communication system; switching, autonomously or based on a command from a base station of the communication system, the user equipment functionality into a low data rate mode; measuring a downlink reference signal received on a downlink from the base station; preparing a feedback based on the measurement by the measuring means; encoding the feedback, thus obtaining encoded data; modulating the encoded data; and providing the modulated encoded data for being sent on the uplink at a predetermined time after the downlink reference signal was received, if the user equipment functionality is in the low data rate mode.

In the method, if the user equipment functionality is in the low data rate mode, uplink data to be transmitted on an uplink to the base station and the feedback may be jointly encoded, thus obtaining the encoded data.

According to a twelfth aspect of the invention, there is provided a method, comprising providing a user equipment functionality of a communication system; switching, autonomously or based on a command from a base station of the communication system, the user equipment functionality into a low data rate mode; measuring a downlink reference signal received on a downlink from the base station; preparing a feedback based on the measurement by the measuring means; jointly encoding, if the user equipment functionality is in the low dato rate mode, uplink data to be transmitted on an uplink to the base station and the feedback, thus obtaining encoded data; modulating the encoded data; and providing the modulated encoded data for being sent on the uplink.

The method of the eleventh or twelfth aspects may be a method of a user equipment.

The method according to the eleventh or twelfth aspects may further comprise repeatedly receiving respective downlink reference signals on the downlink; and prohibiting from measuring the respective downlink reference signal except for every $n^{th}$ downlink reference signal with $n \geq 2$.

The method according to the eleventh or twelfth aspects may further comprise autonomously detecting a downlink reference signal, and triggering the measuring based on the autonomously detecting.

The method according to the eleventh or twelfth aspects may further comprise detecting if the user equipment functionality performs one of one or more predetermined low data rate services, wherein the autonomously switching may be performed if it is detected that the user equipment functionality performs one of one or more predetermined low data rate services.

According to a thirteenth aspect of the invention, there is provided a method, comprising providing a base station functionality of a communication system; at least one of signaling to a user equipment of the communication system a command to switch into a low data rate mode and detecting an indication according to which the user equipment is autonomously switched into the low data rate mode; providing a downlink reference signal; demodulating, if the command was signaled, modulated data comprising a feedback, wherein the modulated data are received on an uplink from the user equipment at a first predetermined time after the downlink reference signal was provided, and wherein the feedback provides information of a state of a downlink to the user equipment based on the downlink reference signal; decoding the demodulated data, thus obtaining the feedback.

In the method, if the command was signaled, the modulated data may comprise uplink data and the feedback which are jointly encoded; and the decoding may be adapted to decode the demodulated data, thus obtaining the uplink data and the feedback.

According to a fourteenth aspect of the invention, there is provided a method, comprising providing a base station functionality of a communication system; at least one of signaling to a user equipment of the communication system a command to switch into a low data rate mode and detecting an indication according to which the user equipment is autonomously switched into the low data rate mode; providing a downlink reference signal; demodulating, if the command was signaled, modulated data comprising uplink data and a feedback which are jointly encoded, wherein the modulated data are received on an uplink from the user equipment, wherein the feedback provides information of a state of the downlink to the user equipment based on the downlink reference signal; decoding the demodulated data, thus obtaining the uplink data and the feedback.

The method according to the thirteenth or fourteenth aspects of the invention may be method of a base station.

The method according to the thirteenth or fourteenth aspects may further comprise providing downlink data to be sent to the user equipment on the downlink according to the feedback after the feedback was received at a second predetermined time after the feedback was requested.

The method according to the thirteenth or fourteenth aspects may further comprise assigning a demodulation reference signal to each of plural user equipments within a cooperation area to which the base station belongs, wherein the respective demodulation reference signals assigned to each of plural user equipments are mutually orthogonal or quasi-orthogonal to each other, wherein the demodulating of the modulated data from each of the user equipments may be based on the respective demodulation reference signal.

The method according to the thirteenth or fourteenth aspects may further comprise detecting a silent period where no data are to be transmitted on the uplink and the downlink; prohibiting from requesting the feedback at times when the silent period is detected.

In the method according to the thirteenth or fourteenth aspects, the indication may comprise downlink data to be sent to the user equipment that are related to one of one or more predetermined low data rate services.

According to a fifteenth aspect of the invention, there is provided a computer program product including a program comprising software code portions being arranged, when run on a processor of an apparatus, to perform the method according to any one of the eleventh to fourteenth aspects.

In the computer program product, the computer program product may comprise a computer-readable medium on which the software code portions are stored, and/or wherein the program may be directly loadable into a memory of the processor.

According to embodiments of the invention, a highly performing VoIP—or more generally—low data rate JP CoMP solution with reduced overhead is achieved. In addition, energy consumption may be reduced. Still furthermore, potential combinations of high and low data rate users may be addressed to optimally serve each of them. By embodiments of the invention, coverage holes for low data rate users may be reduced.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1:
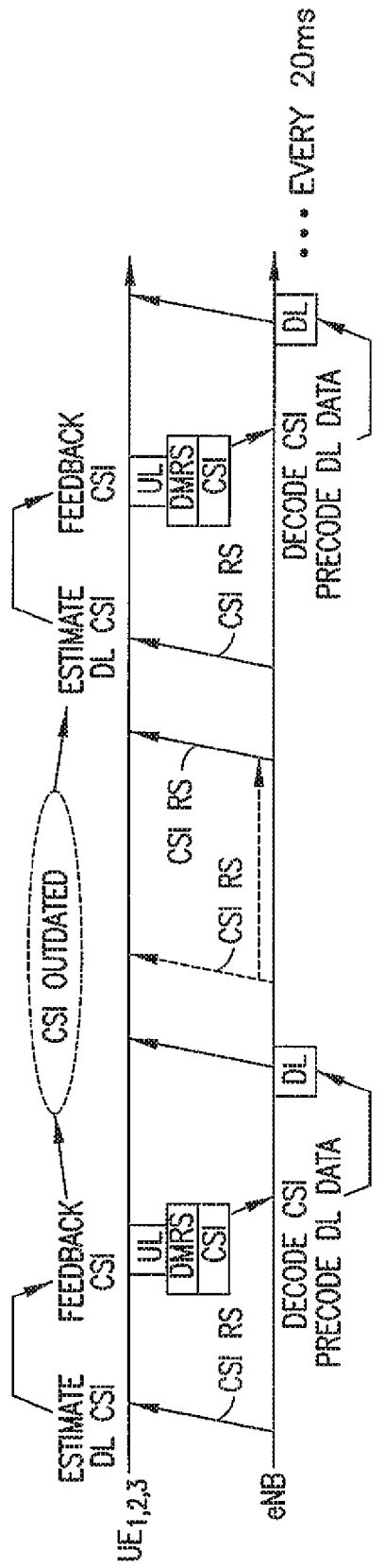
FIG. 1 shows an overall estimation and VoIP CoMP scheme according to an embodiment of the invention.

Herein below, certain embodiments of the present invention are described in detail with reference to the accompanying drawings, wherein the features of the embodiments can be freely combined with each other unless otherwise described.

However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Generally, the focus of CoMP is on the high data rate users, as these are generating high load and have more continuous data transmission, allowing e.g. for continuous channel estimation. Low data-rate users generate only marginal load in a broadband system like LTE so that, at a first glance, improved throughput for such users seems to be less important.

At the same time low data rate services like voice—i.e. in case of LTE/LTE-A: voice over IP (VoIP) calls—are still the most important service in current mobile radio systems and should be therefore supported with highest priority and quality. Cell edge VoIP users—or users experiencing coverage holes—will require despite the low rate—a comparably high number of resources and might lead in combination of a high number of users to a significant load of the network. In addition reducing coverage holes for VoIP users—especially in uplink (UL) is a further important aspect, where improvements are highly welcome.

According to embodiments of the invention, a solution for supporting CoMP functions for low data rate users like e.g. VoIP transmissions is provided. In addition, a potential combination of high and low data rate users is addressed.

A further aspect achieved by improving spectral efficiency of VoIP users may be improved energy efficiency. Switching of eNBs into sleeping mode seems to be one of the most promising energy savers at radio sites and e.g. a 3-fold increased data transmission efficiency due to 3 times higher spectral efficiency for VoIP might lead to a 3 times longer sleeping time of the system.

On the UE side, battery savings might be achieved by using higher modulation and coding schemes (MCS) because of the higher robustness of CoMP compared to single cell transmissions.

JP CoMP typically requires significant overhead with respect to reference signals for channel estimation in a multi cellular environment and generates significant overhead for feedback of channel state information (CSI) information. In addition the signal processing complexity is quite high. This effort is typically only worth if rewarded by significant gains in terms of spectral efficiency or cell edge performance, which ideally requires large amount of user data, i.e. more or less full buffer traffic.

Another aspect is that full buffer traffic might simplify scheduling and user grouping due to the constant available active users.

Full buffer traffic fits very well to continuous channel estimation and CSI reporting allowing exploiting correlations within coherence time of the radio channel. It will further benefit from CSI reporting for a relative large frequency subband as there is a higher probability that the UEs are scheduled for a significant part of the reported subband.

For low data rate traffic and specifically voice over IP (VoIP) users all these benefits for the full buffer traffic are not viable. Voice coders produce only single data packets, e.g. every 20 ms, and are typically being served by semi persistent scheduling.

After 20 ms one may in some cases assume full outdating of the radio channel between two subsequent data packets. Note that VoIP packets are sometimes even scheduled after n times 20 ms with n=1 . . . 4, if the scheduler gathers 2 to 4 subsequent VoIP data packets to transmit them in a single larger data packet. This provides additional coding gain. However, then, the CSI outdating may be up to 80 ms. Therefore, feedback overhead reduction techniques relying on large coherence time for low mobility users like tracking or partly source coding cannot be used because the CSI is outdated.

By applying similar CSI estimation and reporting as for the full buffer traffic the overhead for channel estimation and feedback will easily exceed the potential performance gains of JP CoMP as even a tripling of spectral efficiency for one out of 20 data packets in 20 ms results just in an improvement of 3/20=14%, while overhead for CSI and DMRS might be in the range of 10 to 20% (this is a guess as long as conventional CoMP is not standardized).

A further aspect is that VoIP packets will be sometimes only one physical resource block (PRB). Hence CSI reporting for larger frequency subbands—e.g. over a subband of 5 MHz a' 25PRBs—is very inefficient, although it may be helpful to allow for frequency selective scheduling or multi user scheduling gains.

According to embodiments of the invention, a specific VoIP (or low data rate) CoMP mode, which optimizes CSI estimation, demodulation reference signals (DMRS) and the overall reporting scheme may be defined. Thus, a small overhead with a large performance gain may be achieved.

In some embodiments, the UE may indicate to the eNB that it requires low data rates only, e.g. because it is a VoIP user. Then, the eNB may signal to the UE that it has to switch into the VoIP (or low data rate) CoMP mode. Thus, backward compatibility is ensured. I.e., if the eNB does not support the VoIP (or low data rate) mode, a conventional scheme may be applied.

In some embodiments, the eNB may autonomously decide that the UE is to be switched into the low data rate mode and provide a corresponding signalling to the UE. E.g., the eNB may recognize from the downlink data that the UE performs a VoIP service.

In still some embodiments, instead of indicating to the eNB that a low data rate is required, the UE may decide autonomously to switch into the low data rate mode. The eNB may be informed about the switching by signalling or indirectly. E.g. the eNB may autonomously decide that the UE is to be switched into the low data rate mode but need not to signal it to the UE because it switches autonomously. In this case, the criteria for switching on UE and eNB have to match.

A scheme if a UE is in the VoIP (or low data rate) CoMP mode according to an exemplary embodiment of the invention is illustrated in FIG. 1 and may have at least one of the following features:

The timing of uplink (UL) and/or downlink (DL) transmission of VoIP data packets, reference signals and reporting (see FIG. 1) may be aligned. Thus, the overhead and latency for CSI feedback may be reduced:

In some embodiments, the eNBs may broadcast CSI reference signals (RS) a predefined time before transmitting a next VoIP data packet in UL direction. The predefined time should be such that the UE can measure and estimate all relevant DL channel components before the transmittance of the next VoIP packet. The predefined time need not to be signalled to the UE by the eNB. For example, the predefined time may be defined as a certain number of TTIs such as 2 TTIs or 5 TTIs. This allows transmitting the CSI feedback report together with the VoIP data packet in UL direction, thereby yielding according coding gains. In some embodiments, the CSI RSs might be limited to one or several specific CoMP subbands of the overall frequency band to save unnecessary overhead. Also, in some embodiments, the CSI feedback may be provided separately from the VoIP data packet.

In some embodiments, the UL VoIP data packets may include demodulation RSs (DMRS), which are mutually orthogonal between all cooperative UEs (i.e. UEs in the cooperation area of ENBs where CoMP is applied) allowing the eNBs to estimate the UL radio channel with high quality and to demodulate the UL VoIP packets as well as the CSI feedback by joint detection.

A typical size of the CA according to some embodiments is 3 sites a' 3 cells/sectors each. Hence—if one VoIP user per cell is being served—overall 9 orthogonal RSs would be needed. LTE Release 10 provides 2 orthogonal and 2 quasi orthogonal DMRSs, i.e. overall 4. VoIP users are typically served over several subframes making it possible to add orthogonal cover codes running over several subframes. In case of e.g. two subsequent PRBs, the number of (quasi-)orthogonal RSs would be increased to 8. Per UE one can expect 3-5 strong interferers form the overall 9 cells as being known from previous link level (LL) simulations. Therefore with proper allocation of RS to UEs 8 (quasi-) orthogonal RSs should be sufficient for 9 cells in some embodiments.

According to some embodiments, by keeping the same set of cooperating UEs for several instances of semi persistent scheduling one may optimize the mutual orthogonality of the DMRS for the set of cooperating UEs. The best fitting set of UEs may be defined based on RSRP wideband measurements.

In some embodiments, the DL VoIP data packets may be scheduled and precoded (JP) within a predefined time after reception and decoding of the latest CSI feedback. The predefined time should be on one side as short as possible to minimize further outdating of the channel information, but on the other side, it should give sufficient time for processing. Thus, the predefined time may be defined as a small number of TTIs such as 2 or 5 TTIs.

After e.g. 20 ms or n times 20 ms (n=1, 2, 3, 4) the above described procedure may be repeated, while there are no intermediate transmissions of CSI RSs, saving according overhead.

In some embodiments, the UE in the low data rate mode may detect that a downlink reference signal was received and interpret this as a request to provide a feedback without being requested to provide a feedback by signalling. Note that downlink reference signals may be broadcasted, i.e. not dedicated to a specific UE.

The benefit of the method according to some of the above embodiments is minimal overhead for RSs and maximum performance due to most actual DL CSI information for JP. The timing of CSI RS, feedback of CSI, SRS, precoding etc. may be predefined (e.g. standardized). In some embodiments, it may be semi-statically defined by corresponding new messages, which may allow for sufficient processing time and may avoid unnecessary time delays.

According to some embodiments of the invention, also one or more of the following features may be fulfilled:

VoIP traffic has silent periods without a data packet transmission. For these silent periods CSI RS transmission, CSI feedback and control messages etc. may be adapted or even stopped completely without further extra messages indicating stopping of CSI RS transmission, CSI feedback and control messages etc. during the silent periods to minimize overall overhead and may be restarted shortly prior to the end of the silent period.

VoIP traffic allows for time delays of up to about 200 ms without noticeable degradation in the user perception. Therefore, some schedulers may gather several, e.g. 2, 3 or 4 VoIP packets for one transmission leading to a 40 ms, 60 ms, or 80 ms timing, respectively, between subsequent data packets. Therefore, this specific timing for CSI RSs may be employed according to some embodiments. These timings are currently not discussed in 3GPP. Currently discussed timings are CSI RSs every 5, 10, 20, 40, 200 ms, which is basically a doubling of the RS periods plus one large period (200 ms). Therefore 60 ms and 80 ms may be added to the standard. If CSI RSs are directly coupled to VoIP user scheduling as mentioned above the additional timings may be equivalent thereto for some embodiments.

To avoid excessive reporting per VoIP user over large frequency bands the CSI feedback may be limited to few or even one PRB, i.e. the PRB to be scheduled. Different VoIP users may be bundled into subbands (several adjacent PRBs) with potentially common coding to increase overall coding gain. For UEs of different cooperating cells, the same subbands/PRBs and time slots may be used so that these users may cooperate over longer time periods, thereby minimizing the effort for setting up cooperation areas and user grouping.

According to some embodiments, a single UL transmission instant (e.g. one PRB) containing PUSCH plus CSI feedback for precoding plus DMRS for demodulation may be defined to minimize overall occupied resources. The DMRS might be VoIP CoMP specific so that they optimally support joint detection over several cells.

Specific light SRS may be used in addition prior to UL CoMP transmission to allow for optimized user scheduling in UL. To be useful these SRS may be transmitted in advance at a predefined time slot to the UL data transmission e.g. every n times 20 ms. Light SRS may e.g. provide UL CSI information for e.g. 3 distributed PRBs as potential scheduling allocations. The SRSs may be transmitted within the coherence time of the channel and may, therefore, be combined with the DMRS for improved accuracy.

The μsleep by discontinuous reception (DRX) may be adapted to CSI RS, SRS, PDCCH, PUSCH etc. transmissions. In detail, μsleep may be done in all subframes which do not have to be active for CSI transmission or packet reception etc. If the relative timings for these transmissions are predefined (e.g. in terms of TTIs), μsleep for the remaining subframes may be automatically done.

According to some embodiments, cooperating VoIP UEs may use the same DMRS sequence length running over 1 to several subsequent PRBs (see above). The scheduler may try to group UEs having same overall length at one data transmission. In case of different MCSs or different periodicity for the UEs the length may vary, which may be compensated by using wider bandwidth (several PRBs per time slot) for UEs with higher number of PRBs.

In DL feedback of additional CSI for e.g. second best PRB may be used to provide some additional scheduling options, while still keeping feedback overhead small.

The CSI RS timing for different PRBs may be adapted to different timings of the UE VoIP transmissions (instead of every 10 ms)

A specific narrowband CSI for VoIP users limited to the active VoIP PRBs may be employed in some embodiments. They may be added to regular CSI RS for full buffer traffic users.

For HARQ retransmissions low delay is important. Therefore the next possible scheduling opportunity may be used requiring additional narrowband CSI RS, SRS, CSI feedback and so on just in time. The signals and feedback may be provided as a predefined rule for HARQ retransmission just in time, similar as for regular data packets.

The VoIP specific CSI RS may be used for more than one user in case these users are scheduled within the coherence time of the channel.

E.g. in case of low data rate users other than VoIP semi static scheduling may be adapted by just buffering incoming data in combination with a relative low scheduling rate. In some embodiments, this is not done for delay sensitive applications.

In some embodiments, there may be different timings in DL and UL. In that case, the CSI feedback may be limited to every nth UL data packet, if DL is less often. Different timings are more likely for low data rate traffic than VoIP users.

In some embodiments, a fallback mode for bad CoMP conditions may be employed, which may be single cell transmission, diversity or rescheduling of an UE According to extended link level simulations, the feedback overhead for a single PRB doing JP CoMP over e.g. 3 cells with sufficient accuracy may be in the order of 7 to 10 bits. This might end in an overall feedback overhead of few percent, in case of transmission of VoIP packets of 640 bit every 80 ms. PRB specific CSI RSs might need about 16 resource elements, giving a similar acceptable overhead, which can be reduced further in case 2 or more VoIP users make use of these CSI RSs. This is in particular possible as long as VoIP users will be scheduled into the according coherence time of the radio channel.

According to some embodiments, specific UEs are set into low data rate or VoIP CoMP mode. As a result if such an UE is scheduled at a specific time instant or semi-persistently, the CSI RS, feedback, SRS, DMRS etc will be transmitted according to a predefined order without extra signalling to support JP CoMP in the best possible way.

Figure 2:
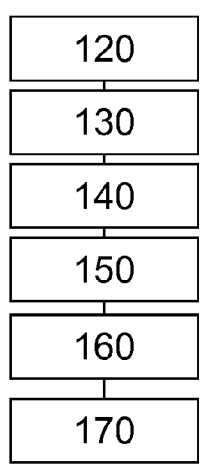
FIG. 2 shows an apparatus according to an embodiment of the invention.
Figure 3:
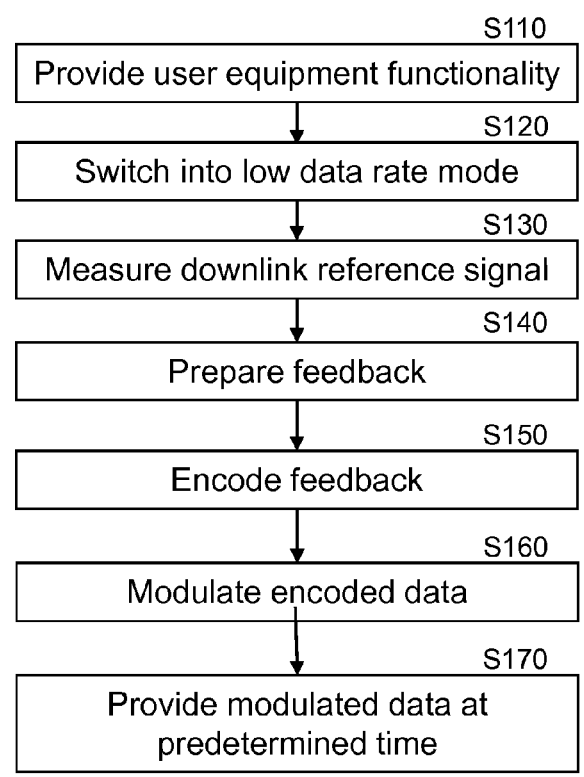
FIG. 3 shows a method according to an embodiment of the invention.

FIG. 2 shows an apparatus according to an embodiment of the invention. The apparatus may be a user equipment such as a UE, providing a user equipment functionality (S110). FIG. 3 shows a method according to an embodiment of the invention. The apparatus according to FIG. 2 may perform the method of FIG. 3 but is not limited to this method. The method of FIG. 3 may be performed by the apparatus of FIG. 2 but is not limited to being performed by this apparatus.

The apparatus may comprise a mode switching means 120, a measuring means 130, a feedback preparing means 140, an encoding means 150, a modulating means 160, and a providing means 170.

The mode switching means 120 may switch, autonomously or based on a command from a base station to which the UE belongs, the user equipment into the low data rate mode (S120).

If a downlink reference signal is received on a downlink from a base station, the measuring means 120 may measure the downlink reference signal to obtain information of the state of the downlink (S120).

Based on the measurement by the measuring means, the feedback preparing means 130 may prepare a feedback (S130).

The encoding means 140 may encode the feedback (S140). The modulation means 150 modulates these encoded data (S150). If the base station is in the low data rate mode, the modulated encoded data are provided for being sent on the uplink to the base station by the providing means 160 at a predetermined time after the receipt of the downlink reference signal (S160). A demodulation reference signal may be provided together with the modulated data.

In some embodiments, the feedback may be encoded together with uplink data to be sent to the base station such as VoIP packets.

Figure 4:
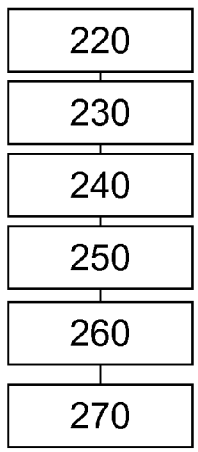
FIG. 4 shows an apparatus according to an embodiment of the invention.
Figure 5:
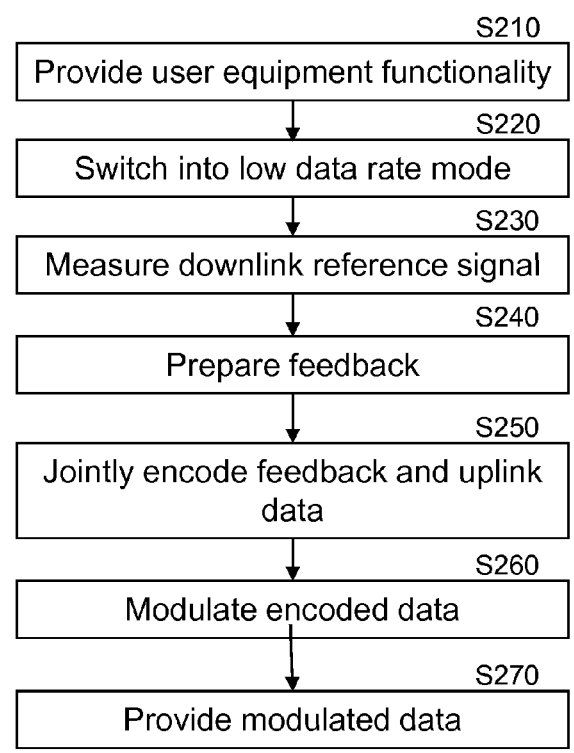
FIG. 5 shows a method according to an embodiment of the invention.

FIG. 4 shows an apparatus according to an embodiment of the invention. The apparatus may be a user equipment such as a UE, providing a user equipment functionality (S210). FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus may comprise a mode switching means 220, a measuring means 230, a feedback preparing means 240, an encoding means 250, a modulating means 260, and a providing means 270.

The mode switching means 220 may switch, autonomously or based on a command from a base station to which the UE belongs, the user equipment into the low data rate mode (S220).

If a downlink reference signal is received on a downlink from a base station, the measuring means 220 may measure the downlink reference signal to obtain information of the state of the downlink (S220).

Based on the measurement by the measuring means, the feedback preparing means 230 may prepare a feedback (S230).

The encoding means 240 may jointly encode the feedback and data to be transmitted on the uplink such as VoIP data packets (S240). The modulation means 250 modulates these encoded data (S250). The modulated encoded data are provided for being sent on the uplink to the base station by the providing means 260 (S260). A demodulation reference signal may be provided together with the modulated data.

In embodiments of the invention, where CoMP is implemented, instead of a single base station, plural base stations may cooperatively act in the same way as the base stations described above.

Figure 6:
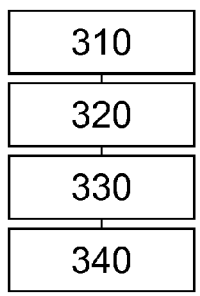
FIG. 6 shows an apparatus according to an embodiment of the invention.
Figure 7:
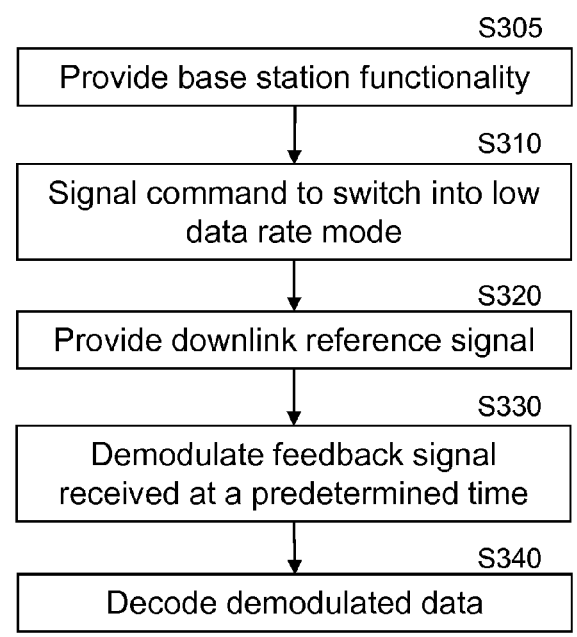
FIG. 7 shows a method according to an embodiment of the invention.

FIG. 6 shows an apparatus according to an embodiment of the invention. The apparatus may be a base station such as an eNB, providing a base station functionality (S305). FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus may comprise a signalling means 310, a downlink reference signal providing means 320, a demodulating means 330, and a decoding means 340.

The signalling means 310 may signal to a user equipment a command to switch into a low data rate mode. (S310).

The downlink reference signal providing means 320 may provide a downlink reference signal (S320).

If modulated data are received on the uplink from the user equipment, the demodulating means 330 may demodulate them (S330). E.g., the demodulation may be based on a demodulation reference signal received together with the modulated data. If the modulated data comprise a feedback, they may be received at a predetermined time after the downlink reference signal was provided. This predetermined time need not to be signaled to the UE before. Herein, a feedback provides information of a state of the downlink to the UE based on the downlink reference signal.

The decoding means 340 may decode the demodulated data, thus obtaining the feedback (S440). In some embodiments, the demodulated data may comprise uplink data, too. Then, by the decoding, both the requested feedback and the uplink data are obtained.

Figure 8:
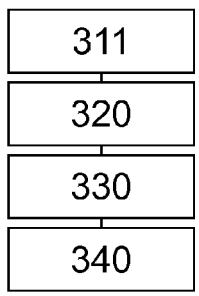
FIG. 8 shows an apparatus according to an embodiment of the invention.
Figure 9:
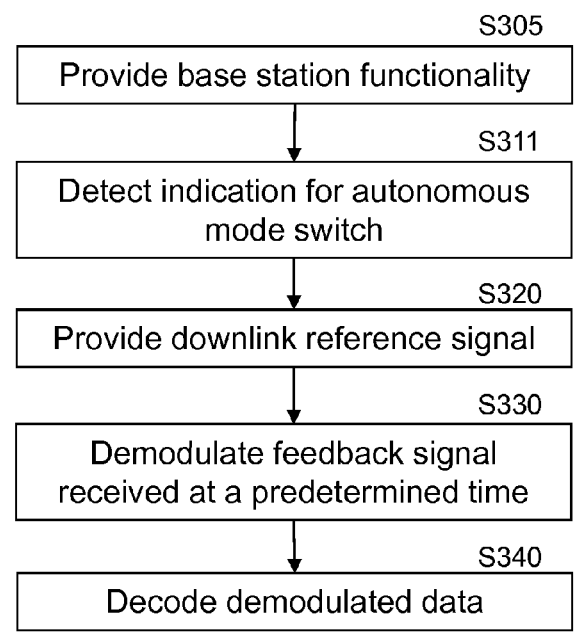
FIG. 9 shows a method according to an embodiment of the invention.

FIG. 8 shows an apparatus according to an embodiment of the invention. The apparatus may be a base station such as an eNB, providing a base station functionality (S305). FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus according to FIG. 8 corresponds to that of FIG. 6, except that the signaling means 310 is replaced by a detecting means 311, adapted to detect an indication according to which the user equipment is autonomously switched into the low data rate mode (S311). Thus, no signaling to switch the UE into the low data rate mode is required. The other means of the apparatus of FIG. 8 are the same as those of FIG. 6, and are, hence, not described again.

Correspondingly, the method according to FIG. 9 corresponds to that of FIG. 7, except that step S310 is replaced by step S311 described above. The other steps of the method of FIG. 9 are the same as those of FIG. 7, and are, hence, not described again.

Figure 10:
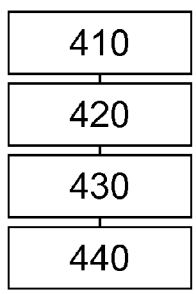
FIG. 10 shows an apparatus according to an embodiment of the invention.
Figure 11:
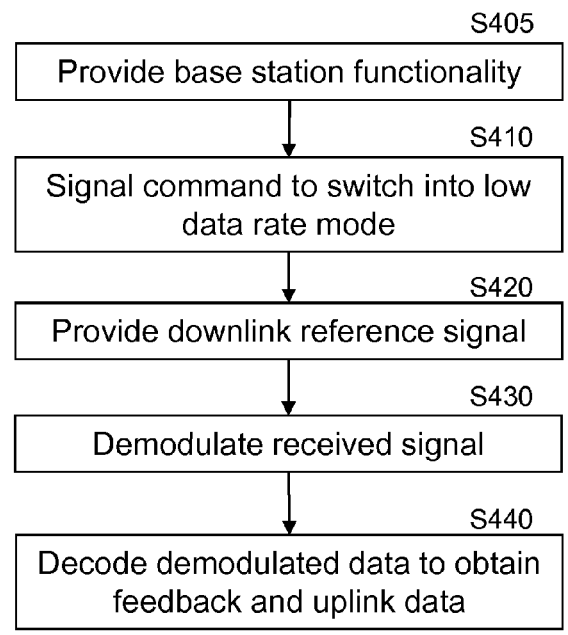
FIG. 11 shows a method according to an embodiment of the invention.

FIG. 10 shows an apparatus according to an embodiment of the invention. The apparatus may be a base station such as an eNB, providing a base station functionality (S405). FIG. 11 shows a method according to an embodiment of the invention.

The apparatus according to FIG. 10 may perform the method of FIG. 11 but is not limited to this method. The method of FIG. 11 may be performed by the apparatus of FIG. 10 but is not limited to being performed by this apparatus.

The apparatus may comprise a signalling means 410, a downlink reference signal providing means 420, a demodulating means 430, and a decoding means 440.

The signalling means 410 may signal to a user equipment a command to switch into a low data rate mode. (S410).

The downlink reference signal providing means 420 may provide a downlink reference signal (S420).

If modulated data are received on the uplink from the user equipment, the demodulating means 430 may demodulate them (S430). E.g., the demodulation may be based on a demodulation reference signal received together with the modulated data.

The decoding means 440 may decode the demodulated data, thus obtaining both a feedback and some uplink data such as a VoIP packet (S440). Herein, a feedback provides information of a state of the downlink to the UE based on the downlink reference signal.

Figure 12:
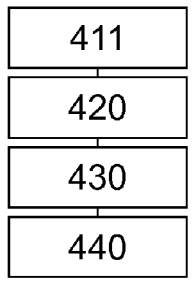
FIG. 12 shows an apparatus according to an embodiment of the invention.
Figure 13:
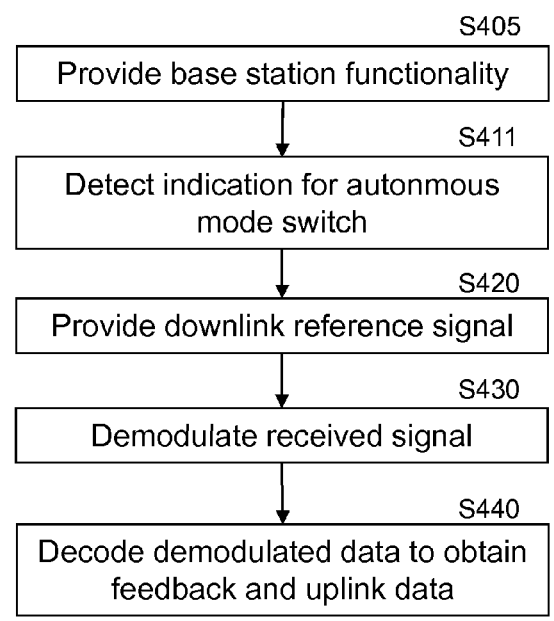
FIG. 13 shows a method according to an embodiment of the invention.

FIG. 12 shows an apparatus according to an embodiment of the invention. The apparatus may be a base station such as an eNB, providing a base station functionality (S405). FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus according to FIG. 12 corresponds to that of FIG. 10, except that the signaling means 410 is replaced by a detecting means 411, adapted to detect an indication according to which the user equipment is autonomously switched into the low data rate mode (S411). Thus, no signaling to switch the UE into the low data rate mode is required. The other means of the apparatus of FIG. 12 are the same as those of FIG. 10, and are, hence, not described again.

Correspondingly, the method according to FIG. 13 corresponds to that of FIG. 11, except that step S410 is replaced by step S411 described above. The other steps of the method of FIG. 13 are the same as those of FIG. 11, and are, hence, not described again.

Embodiments of the invention are described with respect to a 3GPP Long-term evolution advanced system. However, embodiments of the invention may be employed in other 3GPP releases and other mobile networks such as universal mobile telecommunication system (UMTS), or long term evolution (LTE).

Embodiments of the invention are described with respect to VoIP. However, according to other embodiments, other services, preferably with low data rates, or a combination of other services and VoIP may be employed.

If not otherwise stated or otherwise made clear from the context, the statement that two entities are different means that they are differently addressed in the mobile network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a base station, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a user equipment, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. User equipment, comprising
mode switching means adapted to switch, autonomously or based on a command from a base station of a communication system to which the user equipment belongs, the user equipment from a high data rate mode into a low data rate cooperative multipoint transmission mode;
measuring means adapted to measure a downlink reference signal received on a downlink from the base station;
feedback preparing means adapted to prepare a feedback based on the measurement by the measuring means;
encoding means adapted to encode the feedback, thus obtaining encoded data;
modulating means adapted to modulate the encoded data; and
providing means adapted to provide the modulated encoded data for being sent on the uplink at a predetermined time after the downlink reference signal was received, if the user equipment is in the low data rate cooperative multipoint transmission mode.

2. User equipment according to claim 1, wherein the encoding means is adapted, if the user equipment is in the low data rate cooperative multipoint transmission mode, to jointly encode uplink data to be transmitted on an uplink to the base station and the feedback, thus obtaining the encoded data.

3. User equipment according to claim 1, wherein the measuring means is adapted to repeatedly receive respective downlink reference signals on the downlink; the user equipment further comprising prohibiting means adapted to prohibit the measuring means from measuring the respective downlink reference signal except for every $n^{th}$ downlink reference signal with n>2.

4. User equipment, comprising
mode switching means adapted to switch, autonomously or based on a command from a base station of a communication system to which the user equipment belongs, the user equipment from a high data rate mode into a low data rate cooperative multipoint transmission mode;
measuring means adapted to measure a downlink reference signal received on a downlink from the base station;
feedback preparing means adapted to prepare a feedback based on the measurement by the measuring means;
encoding means adapted, if the user equipment is in the low data rate cooperative multipoint transmission mode, to jointly encode uplink data to be transmitted on an uplink to the base station and the feedback, thus obtaining encoded data;
modulating means adapted to modulate the encoded data; and
providing means adapted to provide the modulated encoded data for being sent on the uplink.

5. Base station, comprising
at least one of a signaling means and a detecting means, wherein
the signalling means is adapted to signal to a user equipment of a communication system of the base station a command to switch from a high data rate mode into a low data rate cooperative multipoint transmission mode, and
the detecting means is adapted to detect an indication according to which the user equipment is autonomously switched into the low data rate cooperative multipoint transmission mode;
downlink reference signal providing means adapted to provide a downlink reference signal;
demodulating means adapted, if the command was signaled, to demodulate modulated data comprising a feedback, wherein the modulated data are received on an uplink from the user equipment at a first predetermined time after the downlink reference signal was provided, and wherein the feedback provides information of a state of a downlink to the user equipment based on the downlink reference signal;
decoding means adapted to decode the demodulated data, thus obtaining the feedback.

6. Base station according to claim 5, wherein
the demodulating means is adapted, if the command was signaled, to demodulate the modulated data comprising uplink data and the feedback which are jointly encoded; and
the decoding means is adapted to decode the demodulated data, thus obtaining the uplink data and the feedback.

7. Base station, comprising
at least one of a signaling means and a detecting means, wherein
the signalling means is adapted to signal to a user equipment of a communication system of the base station a command to switch from a high data rate mode into a low data rate cooperative multipoint transmission mode, and
the detecting means is adapted to detect an indication according to which the user equipment is autonomously switched into the low data rate cooperative multipoint transmission mode;
downlink reference signal providing means adapted to provide a downlink reference signal;
demodulating means adapted, if the command was signaled, to demodulate modulated data comprising uplink data and a feedback which are jointly encoded, wherein the modulated data are received on an uplink from the user equipment, and wherein the feedback provides information of a state of a downlink to the user equipment based on the downlink reference signal;
decoding means adapted to decode the demodulated data, thus obtaining the uplink data and the feedback.

8. Method, comprising
providing a user equipment functionality of a communication system;
switching, autonomously or based on a command from a base station of the communication system, the user equipment functionality from a high data rate mode into a low data rate cooperative multipoint transmission mode;
measuring a downlink reference signal received on a downlink from the base station;
preparing a feedback based on the measurement by the measuring means;
encoding the feedback, thus obtaining encoded data;
modulating the encoded data; and
providing the modulated encoded data for being sent on the uplink at a predetermined time after the downlink reference signal was received, if the user equipment functionality is in the low data rate cooperative multipoint transmission mode.

9. Method according to claim 8, wherein,
if the user equipment functionality is in the low data rate cooperative multipoint transmission mode, uplink data to be transmitted on an uplink to the base station and the feedback are jointly encoded, thus obtaining the encoded data.

10. Method according to claim 8, further comprising
repeatedly receiving respective downlink reference signals on the downlink; and
prohibiting from measuring the respective downlink reference signal except for every $n^{th}$ downlink reference signal with n>2.

11. Method, comprising
providing a base station functionality of a communication system;
at least one of signaling to a user equipment of the communication system a command to switch from a high data rate mode into a low data rate cooperative multipoint transmission mode and detecting an indication according to which the user equipment is autonomously switched into the low data rate cooperative multipoint transmission mode;
providing a downlink reference signal;
demodulating, if the command was signaled, modulated data comprising a feedback, wherein the modulated data are received on an uplink from the user equipment at a first predetermined time after the downlink reference signal was provided, and wherein the feedback provides information of a state of a downlink to the user equipment based on the downlink reference signal;

decoding the demodulated data, thus obtaining the feedback.

12. Method according to claim 11, wherein, if the command was signaled, the modulated data comprise uplink data and the feedback which are jointly encoded; and the decoding is adapted to decode the demodulated data, thus obtaining the uplink data and the feedback.

* * * * *